(12) United States Patent
Zhang et al.

(10) Patent No.: US 10,394,099 B2
(45) Date of Patent: Aug. 27, 2019

(54) LIQUID CRYSTAL DISPLAY PANEL WITH MULTIPLE SUB-COMMON ELECTRODES AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hao Zhang, Beijing (CN); Hyungkyu Kim, Beijing (CN); Wei Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 863 days.

(21) Appl. No.: 14/407,312

(22) PCT Filed: Jun. 30, 2014

(86) PCT No.: PCT/CN2014/081279
§ 371 (c)(1),
(2) Date: Dec. 11, 2014

(87) PCT Pub. No.: WO2015/090031
PCT Pub. Date: Jun. 25, 2015

(65) Prior Publication Data
US 2016/0282689 A1    Sep. 29, 2016

(30) Foreign Application Priority Data

Dec. 19, 2013 (CN) .......................... 2013 1 0704668

(51) Int. Cl.
*G09G 3/36* (2006.01)
*G02F 1/133* (2006.01)
(Continued)

(52) U.S. Cl.
CPC .... *G02F 1/136286* (2013.01); *G02F 1/13306* (2013.01); *G02F 1/134309* (2013.01);
(Continued)

(58) Field of Classification Search
CPC combination set(s) only.
See application file for complete search history.

(56) References Cited

U.S. PATENT DOCUMENTS

2003/0117353 A1* 6/2003 Moon .................. G09G 3/3655
345/87
2005/0057193 A1* 3/2005 Ono ..................... G09G 3/3208
315/291
(Continued)

FOREIGN PATENT DOCUMENTS

CN     103676360 A    3/2014
JP      63175890 A    7/1988
(Continued)

OTHER PUBLICATIONS

First Chinese Office Action dated Jun. 1, 2015; Appln. No. 201310704668.X.
(Continued)

*Primary Examiner* — Lauren Nguyen
(74) *Attorney, Agent, or Firm* — Ladas & Parry LLP

(57) ABSTRACT

A liquid crystal display panel and a display device are provided, and in the liquid crystal display panel, a common electrode is divided into a plurality of sub-common electrodes (01) arranged side by side in the extending direction of the gate lines; different common electrode signals are applied to the plurality sub-common electrodes (01), and
(Continued)

their voltage magnitudes gradually increase in a transmitting direction of gate signals over the gate lines. Therefore, the inconsistency of the offsets ΔVp in the voltages of individual pixel electrodes in the entire liquid crystal display panel caused by the delay due to resistance and capacitance is compensated for by the voltages on the sub-common electrodes (01), so as to improve the picture quality of the liquid crystal display panel.

14 Claims, 5 Drawing Sheets

(51) Int. Cl.
  *G02F 1/1343* (2006.01)
  *G02F 1/1362* (2006.01)
(52) U.S. Cl.
  CPC .............. *G09G 3/3655* (2013.01); *G02F 2001/134318* (2013.01); *G02F 2001/134345* (2013.01); *G09G 2300/0426* (2013.01); *G09G 2320/0223* (2013.01); *G09G 2320/0233* (2013.01); *G09G 2320/0247* (2013.01)

(56) References Cited

U.S. PATENT DOCUMENTS

2010/0141886 A1* 6/2010 Lee .................. G02F 1/134363
  349/141
2012/0168791 A1* 7/2012 Zhou .................. H01L 27/0288
  257/93
2012/0268476 A1* 10/2012 Park .................. G09G 3/3607
  345/589

FOREIGN PATENT DOCUMENTS

| | | |
|---|---|---|
| JP | 0566386 A | 3/1993 |
| JP | 11194316 A | 7/1999 |
| KR | 101329705 B1 | 11/2013 |
| TW | 200304633 A | 10/2003 |

OTHER PUBLICATIONS

Chinese Notice of Allowance dated Nov. 9, 2015; Appln. No. 201310704668.X.
International Search Report Appln. No. PCT/CN2014/071279; dated Sep. 28, 2014.
International Search Report Appln. No. PCT/2014/081279; dated Sep. 28, 2014.
International Preliminary Report on Patentability dated Jun. 21, 2016; PCT/CN2014/081279.
Chinese Office Action Appln. No. 201310704668.X; dated Jun. 1, 2015.

* cited by examiner

LIQUID CRYSTAL DISPLAY PANEL WITH MULTIPLE SUB-COMMON ELECTRODES AND DISPLAY DEVICE

TECHNICAL FIELD

Embodiments of the present invention relate to a liquid crystal display panel and a display device.

BACKGROUND

In recent years, liquid crystal display (LCD) panels have gradually been applied in human's everyday life. A Liquid crystal display panel mainly consists of an array substrate, a color filter substrate and liquid crystal interposed therebetween. A liquid crystal display panel implements the display function by controlling the orientation of liquid crystal molecules with an electric field to change the transmissivity of the panel. In the liquid crystal display panel, the electric field for controlling liquid crystal molecules is determined by the difference between the voltages of the pixel electrode and the common electrode. However, due to the parasitic capacitance, an offset of ΔVp may take place in the voltage of the pixel electrode before and after its jump when the gate signal is turned off. To guarantee the display quality of the liquid crystal display panel, voltages of all the pixel electrodes should be consistent as to the voltage offset ΔVp before and after a jump However, in the liquid crystal display panel, because of the delay caused by resistance and capacitance, gate signals transmitted over gate lines may become distorted in the direction in which the gate signals are transmitted along the gate lines, causing delay in the voltages of the pixel electrodes along the transmitting direction; while voltages loaded on the common electrodes are generally consistent. This makes voltage offsets ΔVp of individual pixel electrodes in the entire liquid crystal display panel become inconsistent, which in turn causes problems such as image flickers and the like in the liquid crystal display panel. This phenomenon becomes more remarkable in a large-size LCD.

SUMMARY

At least one of the present invention provides a liquid crystal display panel, including an array substrate having gate lines and an opposed substrate disposed opposite to the array substrate with a common electrode disposed on the array substrate or the opposed substrate, wherein a common electrode consists of a plurality of sub-common electrodes arranged side by side in the extending direction of gate lines; different common electrode signals are applied to the plurality of sub-common electrodes respectively, and their voltage magnitudes gradually increase in a transmitting direction of gate signals over the gate lines.

In an example, a plurality of sub-pixel units arranged in a matrix are disposed in the liquid crystal display panel; and each sub-common electrode has a orthogonal projection on the array substrate overlaying that of at least a column of sub-pixel units.

In an example, the width of each sub-common electrode in the extending direction of gate lines is inversely proportional to the distance between the sub-common electrode and a gate signal input end of a gate line.

In an example, the plurality of sub-common electrodes has a same width in the extending direction of gate lines.

In an example, the plurality of sub-common electrodes are connected in series by a wiring line, which has its first end applied with a first common electrode signal and its second end applied with a second common electrode signal with a voltage difference therebetween.

In an example, the extending direction of the wiring line is the same as that of gate lines.

In an example, the resistance of the wiring line between two adjacent sub-common electrodes is proportional to the distance between their central points.

In an example, data lines are disposed in the array substrate, and the wiring line is configured to be in the same layer and made of a same material as the gate lines or the data lines.

In an example, the liquid crystal display panel includes a driving chip having a first signal output terminal and a second signal output terminal; and the first signal output terminal outputs a first common electrode signal to the first end of the wiring line, and the second signal output terminal outputs a second common electrode signal to the second end of the wiring line.

At least one embodiment of the present invention also provides a display device including the liquid crystal display panel provided by at least one embodiment of the present invention described above.

BRIEF DESCRIPTION OF THE DRAWINGS

For clearer explanation of technical solutions in the present disclosure and in the prior art, accompanying drawings involved in the description of the technical solutions will be briefly introduced hereafter. It is obvious that the accompanying drawings in the following description are only illustrations for some specific implementations of the technical solutions of the present disclosure. Those of ordinary skill in the art will obtain other accompanying drawings according to those without creative effort.

DETAILED DESCRIPTION

Hereafter, technical solutions in embodiments of the present disclosure will be described clearly and comprehensively referring to the accompanying drawings in the embodiments. It is obvious that the embodiments to be described are only some, not all, of the embodiments of the present disclosure. Based on the embodiments of the present disclosure, all other embodiments obtained by those of ordinary skill in the art without any creative effort are within the protection scope of the present disclosure.

Unless otherwise defined, all the technical and scientific terms used herein have the same meanings as commonly understood by one of ordinary skill in the art to which the present disclosure belongs. The terms "first," "second." etc., which are used in the present disclosure and the claims, are not intended to indicate any sequence, amount or importance, but distinguish various components. Also, the terms such as "a," "an," "the," etc., are not intended to limit the amount, but indicate the existence of at lease one. The phrases "connect", "connected", etc., are not intended to be limited to a physical connection or mechanical connection, but may include an electrical connection direct or indirect. "On," "under," "right," "left" and the like are only used to indicate relative position relationship, and when the absolute position of the object which is described is changed, the relative position relationship may be changed accordingly.

At least one embodiment of the present invention provides a liquid crystal display panel including an array substrate with gate lines and an opposed substrate disposed opposite to the array substrate. A common electrode is disposed on the array substrate or the opposed substrate.

Figure 1:
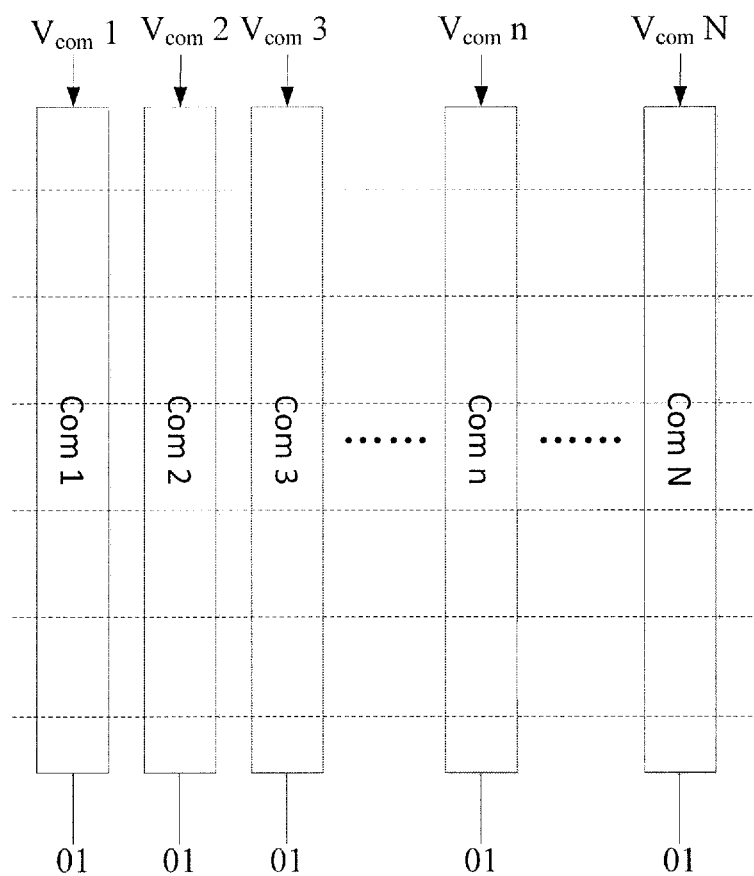
FIG. 1 is a structure diagram of a common electrode provided in an embodiment of the present invention.

FIG. 1 shows the liquid crystal display panel in an embodiment of the present invention, wherein a common electrode consists of a plurality of sub-common electrodes 01 arranged side by side in the extending direction of the gate lines (dashed lines in FIG. 1), which are respectively applied with different common electrode signals Vcom n (n=1, 2, . . . N, where N is the number of the sub-common electrodes) with their voltage magnitudes gradually increasing along the transmitting direction of gate signals over the gate lines (e.g., the direction is from left to right in the Figure).

In the embodiment of the present invention shown in FIG. 1, a common electrode is divided into the plurality of sub-common electrodes arranged side by side in the extending direction of gate lines; compared with a conventional liquid crystal panel, different common electrode signals are applied to individual sub-common electrodes and moreover the voltage magnitudes are gradually increased in the transmitting direction of gate signals over the gate lines. Therefore, the inconsistency of the voltage offsets ΔVp of individual pixel electrodes in the entire liquid crystal display panel, caused by the delay due to resistance and capacitance, is compensated for by the voltages applied to the sub-common electrodes. As a consequence, the problems such as picture flickers etc. caused by the inconsistency of ΔVp are addressed, so that picture quality of the liquid crystal display panel is improved. Furthermore, since different common electrode signals are applied to different sub-common electrodes, signal interference therebetween can be reduced, which alleviates the phenomenon that a liquid crystal display panel appears greenish and as a result the picture quality of the liquid crystal display panel is further improved.

In the embodiment of the present invention shown in FIG. 1, if the left ends of gate lines in the figure are the input ends for gate signals, common electrode signals Vcom n applied to individual sub-common electrodes 01 satisfy the relationship: Vcom 1<Vcom 2< . . . <Vcom n; and if the right ends of gate lines in the figure are input ends for gate signals, common electrode signals Vcom n applied to individual sub-common electrodes 01 satisfy the relationship: Vcom 1>Vcom 2> . . . >Vcom n.

A plurality of sub-pixel units arranged in a matrix is disposed in the liquid crystal display panel provided in an embodiment of the present invention. Each sub-common electrode has an orthogonal projection on the array substrate, and the projection overlays that of at least one column of sub-pixel units on the array substrate. That is, in the liquid crystal display panel provided in the embodiment of the present invention, the width of each sub-common electrode is equal to that of a column of sub-pixel units; in a liquid crystal display panel provided in another embodiment of the present invention, the width of each sub-common electrode is equal to that of a plurality columns of sub-pixel units; however, the width of sub-common electrodes in the liquid crystal display panel provided in at least one embodiment of the present invention is not limited thereto.

In a liquid crystal display panel provided in an embodiment of the present invention, each sub-common electrode is of a rectangle shape; while in a liquid crystal display panel provided in another embodiment of the present invention, each sub-common electrode is of another shape used to implement the liquid crystal display panels described above and not limited here.

Figure 4:
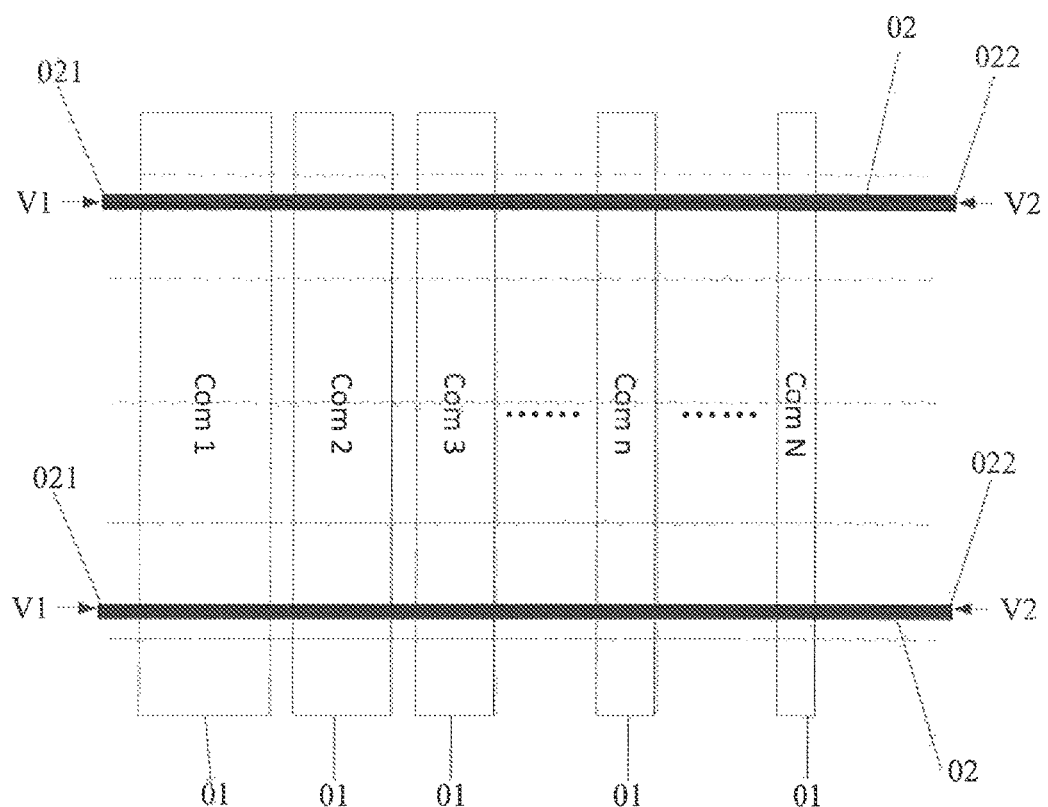
FIG. 4 is a structure diagram of a liquid crystal display panel provided in an embodiment of the present invention.

In a liquid crystal display panel provided in an embodiment of the present invention as illustrated in FIG. 4, the width of each sub-common electrode in the extending direction of gate lines is set to be inversely proportional to the distance between this sub-common electrode and the gate signal input end of a gate line. This is because that, generally, in the transmitting direction of the gate signals over the gate lines in the liquid crystal display panel, the larger the distance away from the gate signal input ends of the gate lines is, the more seriously the gate signals are distorted, and then the smaller number of columns of sub-pixel units each individual sub-common electrode corresponds to, i.e. the smaller the width of the sub-common electrode is, so that more sub-common electrodes can be disposed there with different common electrode signals applied thereto to compensate for the inconsistency in voltage offsets ΔVp of pixel electrodes caused by the serious distortion of the gate signals. On the other hand, the smaller the distance away from the gate signal input ends of the gate lines is, the less likely the gate signals are distorted, and then the larger number of columns of sub-pixel units each individual sub-common electrode corresponds to, i.e., the larger the width of the sub-common electrode is, which ensures that the process difficulty of manufacturing common electrodes there is reduced while the voltage offsets ΔVp of the pixel electrodes are compensated. In a liquid crystal display panel provided by a different embodiment of the present invention, width of each sub-common electrode is determined according to the actually required effect of equalization for the voltage magnitudes of the common electrodes, which is not limited here.

In a liquid crystal display panel provided in an embodiment of the present invention (e.g., shown in FIG. 1), a plurality of sub-common electrodes 01 is configured to have the same width along the extending direction of gate lines to simplify the process technology.

Delay of a gate signal being transmitted on a gate line varies linearly in a liquid crystal display panel. In view of this, wring lines are provided in a liquid crystal display panel provided in an embodiment of the present invention, so that different common electrode signals are respectively applied to a plurality of sub-common electrodes by the linear voltages resulting from the resistance of the wiring lines, and the voltage magnitudes of the signals gradually increase in the transmitting direction of gate signals over gate lines. In an example of the present embodiment shown in FIG. 2a and FIG. 2b, a plurality of sub-common electrodes 01 are connected in series by wiring lines 02, different common electrode signals are applied to two ends of each wiring line, i.e., the first common electrode signal V1 is applied to the first end 021 of the wiring line, the second common electrode signal V2 is applied to the second end 022 of the wiring line, and there is a voltage difference between them, thereby realizing application of different common electrode signals to the plurality of sub-common electrodes.

As the specific principle of the embodiment described above, different signals are applied to two ends of a wiring line 02, resulting in a voltage difference therebetween, which is distributed along the wiring line due to its own resistance and forms different voltages at different positions along the wiring line. Furthermore, a plurality of sub-common electrodes 01 is connected in series at different positions along the wiring line 02 and therefore applied with the different voltages in the positions respectively.

Figure 2A:
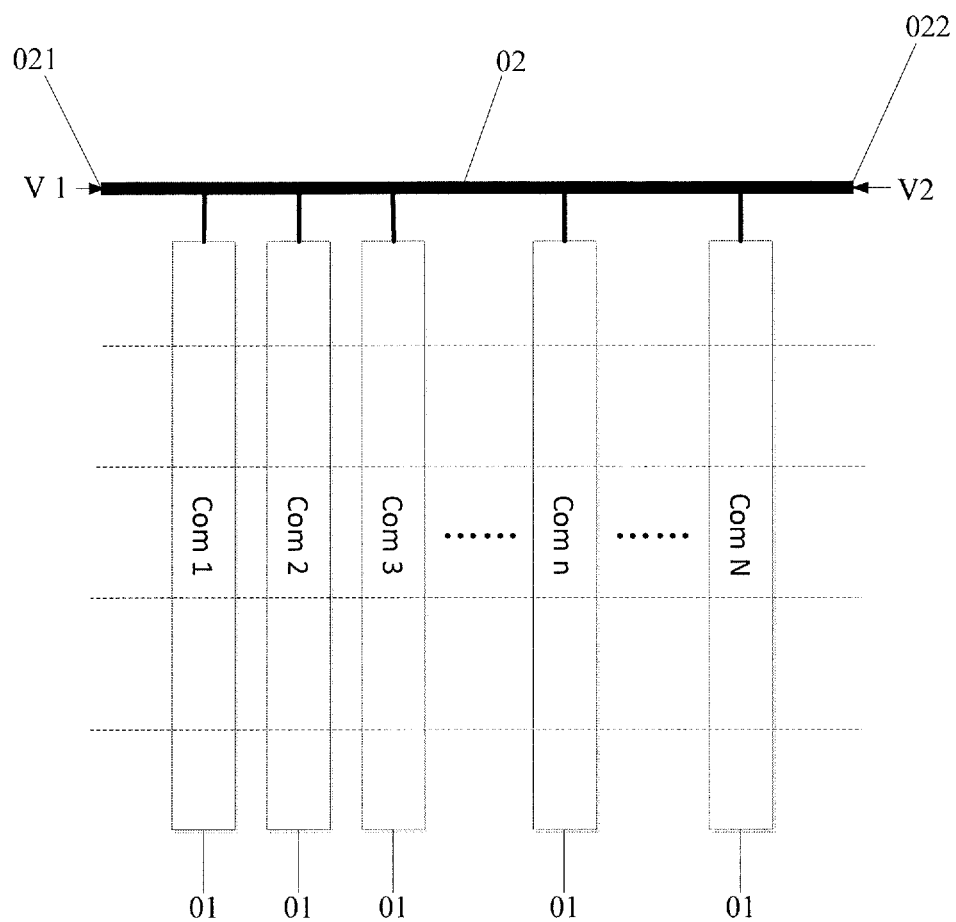
FIG. 2a is a first structure diagram of a liquid crystal display panel provided in an embodiment of the present invention.
Figure 2B:
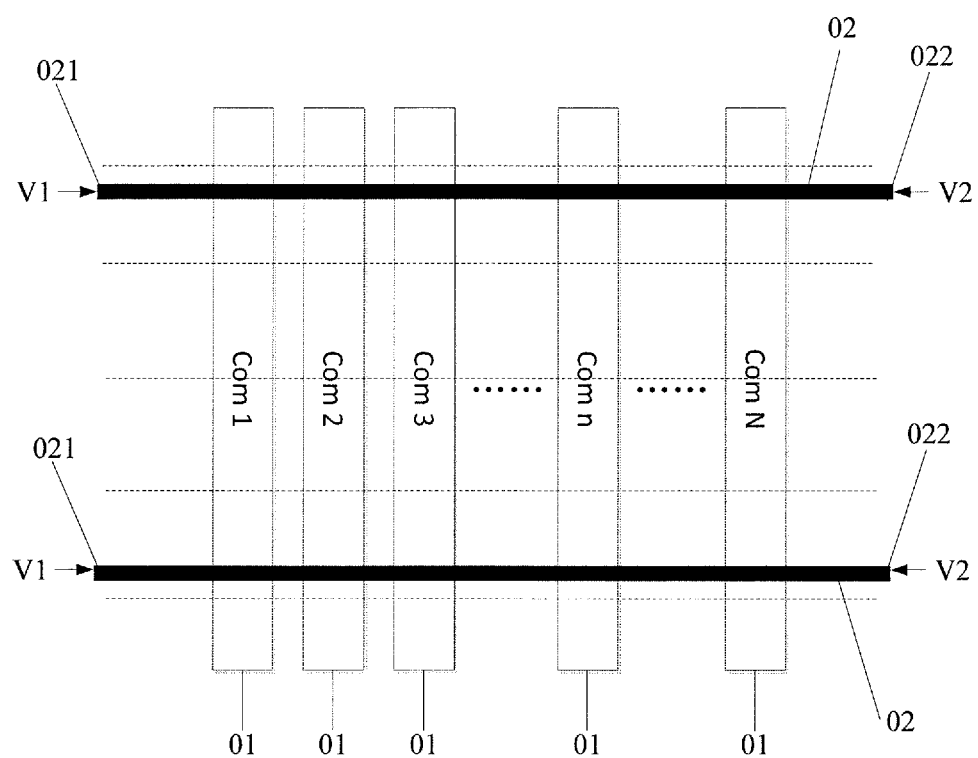
FIG. 2b is a second structure diagram of a liquid crystal display panel provided in an embodiment of the present invention.

Still referring to FIG. 2a and FIG. 2b, in another example of the liquid crystal display panel with the above-mentioned wiring line provided in an embodiment of the present invention, if the left ends of the gate lines (dashed lines) in the figures are gate signal input ends, the voltage magnitude of the first common electrode signal V1 is smaller than that of the second common electrode signal V2, i.e., voltage magnitudes at points along the wiring line 02 gradually increase in the direction from the first end 021 to the second end 022 of the wiring line 02; and if the right ends of the gate lines in the figures are gate signal input ends, the voltage magnitude of the first common electrode signal V1 is larger than that of the second common electrode signal V2, i.e., voltage magnitudes at points along the wiring line 02 gradually decrease in the direction from the first end 021 to the second end 022 of the wiring line 02.

In a liquid crystal display panel provided in a different embodiment of the present invention, the voltage magnitudes of the first common electrode signal V1 and the second common electrode signal V2 are set as actually required. For example, the voltage magnitudes of the first common electrode signal and the second common electrode signal are determined according to the voltage magnitudes of the first end and the second end of the wiring line as actually required for the liquid crystal display panel to achieve a desired display effect. It should be noted that, the criteria for judging the display effect of a liquid crystal display panel is the uniformity and degree of its flickers. In general, when the flicker value is lower than 10%, flickers are substantially invisible to human eyes, and this situation is regarded as a preferred display effect. In an example, the flicker value is set to be about 2% to achieve a desired display effect.

In a liquid crystal display panel provided in an embodiment of the present invention, all sub-common electrodes are connected in series by one wiring line, as shown in FIG. 2a. In a liquid crystal display panel provided in another embodiment of the present invention, all sub-common electrodes are connected in series by a plurality of wiring lines, as shown in FIG. 2b. In a liquid crystal display panel provided in yet another embodiment of the present invention, the wiring line(s) are disposed in a non-display area of the liquid crystal display panel to guarantee the aperture ratio of the liquid crystal display panel. However, this is not intended to limit the arrangement of the wiring lines in the liquid crystal display panel provided in at least one embodiment of the present invention.

Still referring to FIG. 2a and FIG. 2b, the resistance of the wiring line 02 between two adjacent sub-common electrodes 01 is proportional to the distance between their central points. The larger the distance between the central points of the two adjacent sub-common electrodes 01 is, the larger the length and, as a result, the higher the resistance of the wiring line connecting between the two adjacent sub-common electrodes are. In an example, the sub-common electrode 01 is of a rectangle shape, and the central point of the sub-common electrode is the intersecting point of the two diagonals of the rectangle.

Still referring to FIG. 2a and FIG. 2b, in a liquid crystal display panel provided in an embodiment of the present invention, the extending direction of the wiring line 02 is the same as that of gate lines (dashed lines in FIG. 2a and FIG. 2b).

In order to reduce process steps and save production costs, in a liquid crystal display panel provided in an embodiment of the present invention, data lines are disposed on the array substrate, and the wiring line is configured to be in the same layer and made of the same material as the gate lines or the data lines. In this way, the wiring lines and the gate lines or the data lines can be prepared in the same layer during preparation without addition of any new preparing process, and what is needed is only to alter the patterning of the corresponding film layer.

Figure 3:
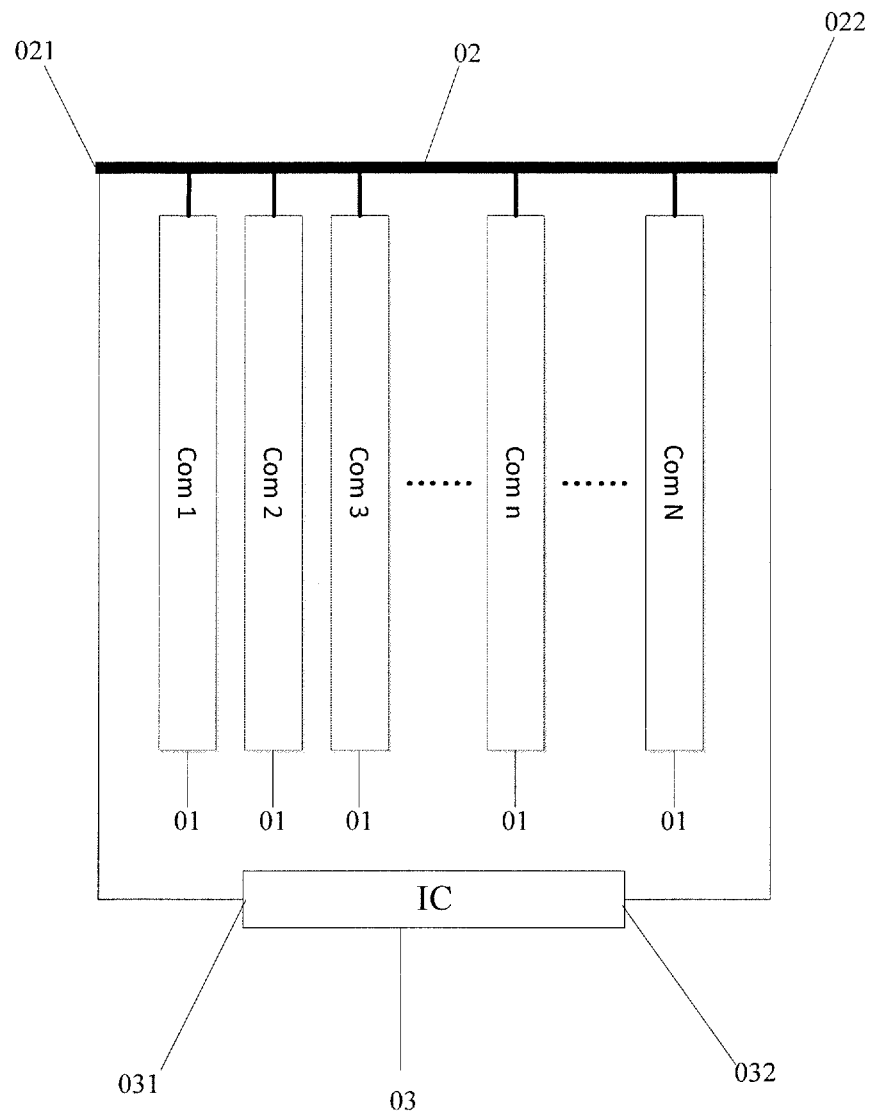
FIG. 3 is a third structure diagram of a liquid crystal display panel provided in an embodiment of the present invention.

FIG. 3 shows a liquid crystal display panel provided in an embodiment of the present invention, the first common electrode signal and the second common electrode signal are applied respectively to the first end 021 and the second end 022 of the wiring line 02 by a driving chip (IC) 03 of the liquid crystal display panel. In an example, the driving chip 03 is equipped with, for outputting common electrode signals, a first signal output terminal 031, which is connected with and thus used to output the first common electrode signal to the first end 021 of the wiring line 02, and a second signal output terminal 032, which is connected with and thus used to output the second common electrode signal to the second end 022 of the wiring line 02.

In terms of specific structure, existing common electrode driving chips can be used for the above-mentioned driving chip, which will not to be further detailed here.

Based on the same inventive concept, at least one embodiment of the present invention further provides a display device comprising the liquid crystal display panel provided in at least one embodiment of the present invention described above. The display device may be, such as, a cell phone, a tablet, a television set, a display, a notebook computer, a digital photo frame, a navigator or any other product or component with a display function. Embodiments of the above mentioned liquid crystal display panel may be referred to for implementations of the display device, which will not be repeated here.

At least one embodiment of the present invention provides a liquid crystal display panel and a display device. In the liquid crystal display panel, a common electrode is divided into a plurality of sub-common electrodes arranged side by side in the extending direction of gate lines, and then different common electrode signals may be applied to the individual sub-common electrodes and moreover the voltage magnitudes thereof gradually increase in the extending direction of gate signals on gate lines. Therefore, the inconsistency of the voltage offsets ΔVp of individual pixel electrodes in the entire liquid crystal display panel, caused by delay due to resistance and capacitance, is compensated for by voltages on the sub-common electrodes. As a consequence, the problems such as picture flickers etc. caused by the inconsistency of ΔVp are addressed, so that picture quality of the liquid crystal display panel is improved. Furthermore, since different common electrode signals are applied to different sub-common electrodes, signal interference is reduced, which alleviates the phenomenon that a liquid crystal display panel appears greenish and as a result the picture quality of the liquid crystal display panel is further improved.

The above implementations are only for the purpose of explaining, rather than limiting, the present disclosure. One of ordinary skill in the art can further make various modifications and variations without departing from the spirit and scope of the present disclosure. Therefore all equivalents fall within the scope of the present disclosure and the scope of patent protection for the present disclosure should be defined by claims.

The present application claims priority of China patent application No. 201310704668.X filed on Dec. 19, 2013, which is incorporated herein by reference in its entirety.

The invention claimed is:

1. A liquid crystal display panel, comprising an array substrate having gate lines and an opposed substrate disposed opposite to the array substrate with a common electrode disposed on the array substrate or the opposed substrate,
wherein the common electrode comprises a plurality of sub-common electrodes arranged side by side in an extending direction of gate lines; different common electrode signals are applied to the plurality of different sub-common electrodes respectively, and magnitudes of the different common electrode signals applied to the plurality of different sub-common electrodes gradually increase in a transmitting direction of gate signals over the gate lines;
a width of each sub-common electrode in the extending direction of a gate line is inversely proportional to a distance between the sub-common electrode and a gate signal input end of the gate line.

2. The liquid crystal display panel of claim 1, wherein a plurality of sub-pixel units arranged in a matrix are disposed in the liquid crystal display panel, and
each sub-common electrode has an orthogonal projection on the array substrate overlaying that of at least a column of sub-pixel units on the array substrate.

3. The liquid crystal display panel of claim 1, wherein the plurality of sub-common electrodes are connected in series by a wiring line, a first end of the wiring line is applied with a first common electrode signal and a second end thereof is applied with a second common electrode signal, and there is a voltage difference between the first common electrode signal and the second common electrode signal.

4. The liquid crystal display panel of claim 3, wherein the extending direction of the wiring line is the same as that of the gate lines.

5. The liquid crystal display panel of claim 3, wherein a resistance of the wiring line between two adjacent sub-common electrodes is proportional to a distance between central points of the two adjacent sub-common electrodes.

6. The liquid crystal display panel of claim 3, wherein data lines are disposed on the array substrate; the wiring line is configured to be in a same layer and made of a same material as the gate lines; or the wiring line is configured to be in a same layer and made of a same material as the data lines.

7. The liquid crystal display panel of claim 3, wherein the liquid crystal display panel comprises a driving chip having a first signal output terminal and a second signal output terminal; and
the first signal output terminal outputs a first common electrode signal to the first end of the wiring line, and the second signal output terminal outputs a second common electrode signal to the second end of the wiring line.

8. A display device comprising a liquid crystal display panel comprising an array substrate having gate lines and an opposed substrate disposed opposite to the array substrate with a common electrode disposed on the array substrate or the opposed substrate,
wherein the common electrode comprises a plurality of sub-common electrodes arranged side by side in an extending direction of gate lines; different common electrode signals are applied to the plurality of sub-common electrodes respectively, and magnitudes of the different common electrode signals applied to the plurality of different sub-common electrodes gradually increase in the direction of gate signals on the gate lines;
a width of each sub-common electrode in the extending direction of a gate line is inversely proportional to a distance between the sub-common electrode and a gate signal input end of the gate line.

9. The display device of claim 8, wherein a plurality of sub-pixel units arranged in a matrix are disposed in the liquid crystal display panel; and
each sub-common electrode has an orthogonal projection on the array substrate overlaying that of at least a column of sub-pixel units.

10. The display device of claim 8, wherein the plurality of sub-common electrodes are connected in series by a wiring line, a first end of the wiring line is applied with a first common electrode signal and a second end thereof is applied with a second common electrode signal, and there is a voltage difference between the first common electrode signal and the second common electrode signal.

11. The display device of claim 10, wherein the extending direction of the wiring line is the same as that of the gate lines.

12. The display device of claim 10, wherein a resistance of the wiring line between two adjacent sub-common electrodes is proportional to a distance between central points of the two adjacent sub-common electrodes.

13. The display device of claim 10, wherein data lines are disposed on the array substrate; the wiring line is configured to be in a same layer and made of a same material as the gate lines; or and the wiring line is configured to be in a same layer and made of a same material as the data lines.

14. The display device of claim 10, wherein the liquid crystal display panel comprises a driving chip having a first signal output terminal and a second signal output terminal; and
the first signal output terminal outputs a first common electrode signal to the first end of the wiring line, and the second signal output terminal outputs a second common electrode signal to the second end of the wiring line.

* * * * *